United States Patent [19]

Ahern et al.

[11] 4,380,379

[45] Apr. 19, 1983

[54] OPTOMETRIC DEVICE

[75] Inventors: John Ahern, Barrington; Wayne Farmer, Lincoln, both of R.I.; David Hawes, Fairhaven; Herbert J. McEvoy, Jr., North Attleboro, both of Mass.

[73] Assignee: Fairfield Optical Company, Inc., Mansfield, Mass.

[21] Appl. No.: 181,452

[22] Filed: Aug. 25, 1980

[51] Int. Cl.³ .......................... G02C 1/04; G02C 5/00
[52] U.S. Cl. .................................... 351/106; 351/109; 351/142; 351/154
[58] Field of Search ............... 351/106, 109, 154, 140, 351/108, 86, 142; 2/442, 443

[56] References Cited

FOREIGN PATENT DOCUMENTS 1065995 6/1954 France .................................. 351/108
775293 5/1957 United Kingdom ................ 351/106

Primary Examiner—John K. Corbin
Assistant Examiner—Rodney Bovernick
Attorney, Agent, or Firm—Sprung, Horn, Kramer & Woods

[57] ABSTRACT

An optometric device includes a semi-rimless plastic two lens frame having two rim surfaces for mounting two lenses in the frame, each having a circumferential groove therearound. The lenses are mounted by the use of a rib projecting from the rim surfaces and integral therewith and configured to engage with a portion of the lens groove to axially fix the lens and by a line and winder which releasably engages the remaining portion of the groove of the lens to radially fix the lens.

10 Claims, 8 Drawing Figures

OPTOMETRIC DEVICE

BACKGROUND OF THE INVENTION

The present invention relates to an optometric device, in particular eyeglasses including semi-rimless frames having a lens retention system for mounting lenses having a circumferential groove therearound.

Mounting systems for circumferentially grooved lenses are known in the art, but in the past have had numerous problems associated therewith which made the commercial utilization thereof undesirable although the use of this type of lens is desirable since the grinding of the lens is simplified and it provides stability and rigidness when properly mounted.

The prior art systems were directed exclusively to metal frames wherein a plastic rib which is a separately molded piece is mechanically attached to the frame. This system has the disadvantages of being extremely costly and unreliable since the molded piece often separates from the frame.

Moreover, lens retention systems are known which utilize a line and winder device for maintaining the lens in position, however the winding device is made of plastic and is unthreaded but which is not self-locking and is therefore capable of undesired loosening or opening.

SUMMARY OF THE INVENTION

The object of the present invention is to provide a lens retention system for use with semi-rimless frames for maintaining circumferentially grooved lenses in place in the frames.

This object is achieved in part by the novel use of plastic frames having rim surfaces with a rib projecting therefrom which is integral with the plastic frames and engageable in the circumferential groove of the lens.

The object of the present invention is also achieved by the line winder of the present invention which utilizes a threaded rod having means engaging one end of a line therein and configured so as to provide an interference fit with a bore in the lens frame when the line is wrapped around the threads thereof and is rotatable about its longitudinal axis to effect the simultaneous wrapping around and insertion of the threaded member into the bore while making the line taut and thus locking the lens in place.

The advantages of this kind of lens retention system is that it provides a positive lock for both the upper lens periphery and the lower lens and which is reliable and low in production costs.

Numerous other features, objects and advantages of the invention will become apparent from the following specification when read in conjunction with the accompanying drawings wherein:

DETAILED DESCRIPTION OF THE INVENTION

Figure 1:
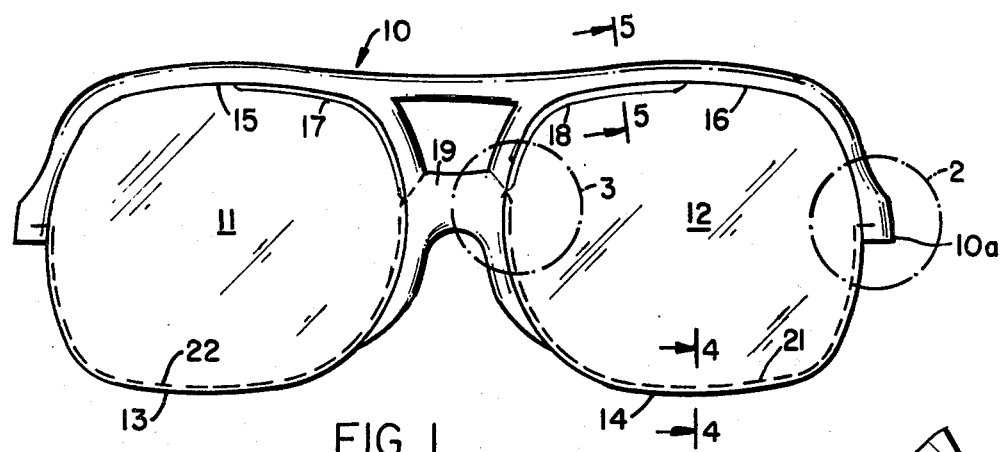
FIG. 1 is a front view of an optometric device according to the present invention.

Referring now to FIG. 1, the optometric device of the present invention includes semi-rimless frames 10 for mounting lenses 11 and 12 therein. The frame 10 includes a bridge portion 19 and rim surfaces 15 and 16, wherein for purposes of illustration it is shown that the rim surface 16 extends between the bridge portion 19 and the end portion 10a.

Figure 4:
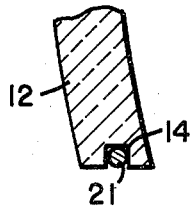
FIG. 4 is a sectional view taken along line 4—4 in FIG. 1.
Figure 5:
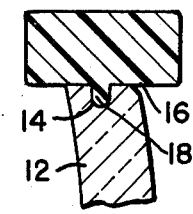
FIG. 5 is a sectional view taken along line 5—5 in FIG. 1.

As is shown in more detail with respect to lens 12 in FIGS. 4 and 5, lens 12 includes a circumferential groove 14 which extends entirely around the lens and is formed by grinding where the lens is made of glass or may be formed by a molding process when the lens is formed from plastic.

In a particularly advantageous embodiment of the invention, the frame 10 is made of plastic and the rim surfaces 15 and 16 include ribs 17 and 18 integral with the plastic frames and configured to be engaged in the groove 14 as shown in FIG. 5. The ribs 17 and 18 are preferably formed by machining the frames and thus are formed from a single piece of plastic and are preferably disposed at the upper corner of the lens adjacent the bridge 19.

The integral machined ribs 17 and 18 provide a positive lock for the upper lens periphery and ensure against axial displacement of the lenses during use of the glasses.

Figure 3:
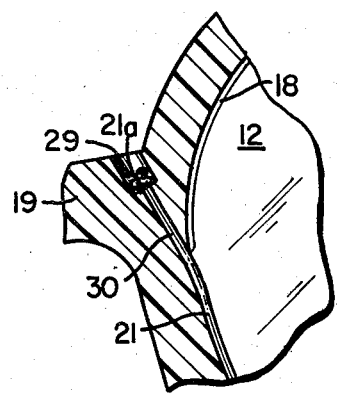
FIG. 3 is a sectional view of detail 3 of FIG. 1.
Figure 2:
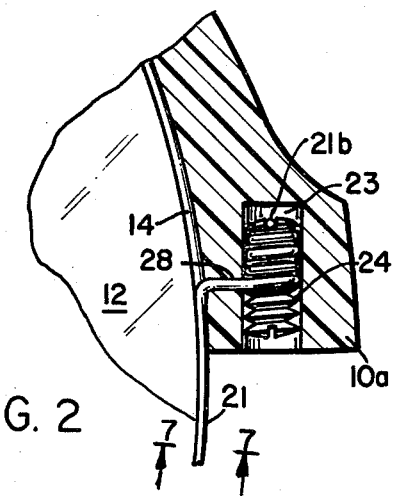
FIG. 2 is a sectional view of detail 2 in FIG. 1.

The lens retention system, in addition to comprising the ribs 17 and 18 coacting with circumferential grooves 13 and 14, also includes the line and winder system shown in FIGS. 2-4.

Referring now to FIGS. 2-4, the line and winder system is provided for each lens and includes lines 21 and 22 shown in position in FIG. 1 by the dotted lines therein. For the sake of simplicity, an explanation will be given of the single line and winder shown for use with lens 12.

As shown in FIG. 3, the bridge portion 19 of the frame includes a bore 30 extending therethrough and opening at the portion of the rim corresponding to groove 14 of lens 12. At the upper end of the throughbore 30 is a counterbore 29 which enables the end 21a of line 21 to be knotted and to seat in the counterbore 29 without being exposed. The knot 21a prevents the line from sliding through the throughbore 30.

The throughbore 30 is configured so that the line 21 runs between the rim surface 16 and the lens 12 in groove 14 and thereafter is seated in groove 14 as shown in FIG. 4. The other end of the line 21, labeled 21b, is threaded through slot 28 which opens into an unthreaded bore 23 in which the winder 24 is seated. The bore 23 is preferably disposed in the end portion 10a of the frame since the frame is of increased thickness at that portion.

Figure 6:
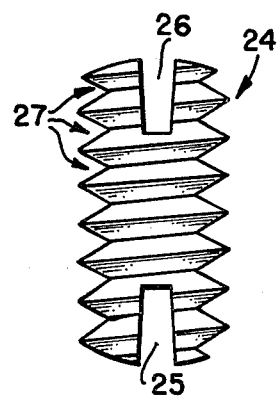
FIG. 6 is a front view of the winder of FIG. 2.

The winder 24 which is shown in more detail in FIG. 6, is in the form of a modified set screw which has means including tapered slot 26 for engaging end 21b of the line 21 and means including slot 25 for enabling the turning of the winder 24 via a screw driver or the like.

The winder 24 is preferably configured so that the line can neatly wind through the threads thereof and that the line, when wound around the screw extends beyond and enlarges the diameter of the screw so that a slight interference fit exists between the bore 23 and the enlarged winder diameter. This interference fit provides a locking action which prevents the entire assembly from loosening while in use.

In use, each lens 11, 12 is set in place and the line is threaded so as to seat in the exposed portion of the groove 13, 14 and is threaded through slot 28 into bore 23. The end portion 21b of the line is engaged in the tapered slot 26. The winder 24 is then rotated towards the closed end of the bore 23 and as it is turned, the line is neatly wound through the threads 27 and extends beyond and enlarges the winder diameter to form the aforesaid interference fit. When the line 21 is taut, the turning is completed and the lens is completely mounted.

Figure 7A:
FIGS. 7a and 7b are sectional views along line 7—7 of the line in FIG. 2.
Figure 7B:

FIGS. 7a and 7b show alternative forms of the line 21. In FIG. 7a, the line 21' includes a stainless steel core surrounded by a nylon jacket while in FIG. 7b, the line 21" is composed solely of nylon.

The winder 22 can be formed from a standard set screw having the correct length and set size by merely adding slots at both ends. Alternatively, the winder 24 can be made entirely from scratch using rod stock, threading it and slotting it and then cutting it to length.

In a particularly commercial embodiment, the line 21 has a diameter of from 0.015 to 0.020 inches with a diameter of slot 28 of being from 0.020 to 0.025 inches. The bore 23 has a diameter of from 0.125 to 0.128 inches. The winder 24 is preferably made of a metal for example a 12 or 18% nickel silver alloy and has a thread size of 5-40 UNC-2A. The winder has a length of approximately 0.2 inches and the slots 25 and 26 are approximately 0.05 inches in depth and taper from a bottom width of 0.016 inches to a top width of 0.021 inches.

It will of course be appreciated by those skilled in the art that other materials can be used for the line and winder components without departing from the scope of the present invention. It is also apparent that the present invention can be utilized for mounting a single lens or more than two lenses to a frame and still utilize the concepts and features described herein.

It is also evident that those skilled in the art may make numerous modifications of the specific embodiments described herein without departing from the inventive concepts and that consequently the invention should be construed as embracing each novel feature of the present invention as disclosed.

What is claimed is:

1. An optometric device comprising:
a semi-rimless plastic two lens frame having two rim surfaces;
two lenses for mounting in the frame each having a circumferential groove therearound; and
means for mounting the lenses in the frame comprising for each lens means forming a rib projecting from the rim surface and integral therewith and configured to engage with a portion of the lens groove to axially fix the lens and means connected to the frame for releasably engaging a remaining portion of the groove of the lens to radially fix the lens, wherein the releasably engaging means comprises a flexible line, means connecting the line is extendable along a portion of the remaining lens groove and receivable therein and winding means mounting in the frame and connected to the other end of the line for maintaining the line in a taut state, the winding means comprising means forming an unthreaded bore in the frame and a threaded rod having means disposed at one end for engaging said other end of the line and configured to tightly fit in the bore when the line is wrapped in the threads thereof and having means disposed at the other end effecting the turning thereof to simultaneously wrap the line therearound and insert the rod in the bore until the line is taut.

2. The device according to claim 1, wherein the means connecting the one end of the line comprises a second bore in the frame followed by a relatively narrower throughbore opening at the rim adjacent one end of the rib.

3. The device according to claim 2, wherein the one end of the line is knotted and is seated in the second bore.

4. The device according to claim 1, wherein the line comprises nylon.

5. The device according to claim 4, wherein the line comprises a stainless steel core with a nylon jacket.

6. An optometric device comprising:
a semi-rimless two lens frame having two rim surfaces;
two lenses for mounting in the frame, each having a circumferential groove therearound; and
means for mounting the lenses in the frame comprising for each lens means forming a rib projecting from the rim surface and configured to engage with a portion of the lens groove to axially fix the lens and means connected to the frame for releasably engaging a remaining portion of the groove of the lens to radially fix the lens including a flexible line, means connecting the line at one end to the frame so that it is extendable along a portion of the remaining lens groove and receivable therein and winding means mounted in the frame and connected to the other end of the line to maintain the line in a taut state, the winding means comprises means forming an unthreaded bore and a threaded rod configured to tightly fit in the bore when the line is wrapped around the threads thereof and having means disposed at one end for engaging said other end of the line and having means disposed at the other end for effecting the turning thereof to simultaneously wrap the line therearound and insert the rod in the bore until the line is taut.

7. The device according to claim 6, wherein the means connecting the one end of the line comprises a second bore in the frame followed by a relatively narrower throughbore opening at the rim adjacent one end of the rib.

8. The device according to claim 7, wherein the one end of the line is knotted and is seated in the second bore.

9. The device according to claim 8, wherein the line comprises nylon.

10. The device according to claim 7, wherein the line comprises a stainless steel core with a nylon jacket.

* * * * *